July 27, 1948.

T. G. McLAURIN ET AL 2,446,055

MACHINE FOR CLEANING AND SEPARATING
FLAX OR OTHER FIBROUS PLANTS

Filed Nov. 3, 1944

INVENTORS
THOMAS GRAHAM MCLAURIN
ROBERT DUNCAN

By

ATTORNEY.

July 27, 1948.　　　T. G. McLAURIN ET AL　　　2,446,055
MACHINE FOR CLEANING AND SEPARATING
FLAX OR OTHER FIBROUS PLANTS
Filed Nov. 3, 1944　　　　　　　　　　　4 Sheets-Sheet 2
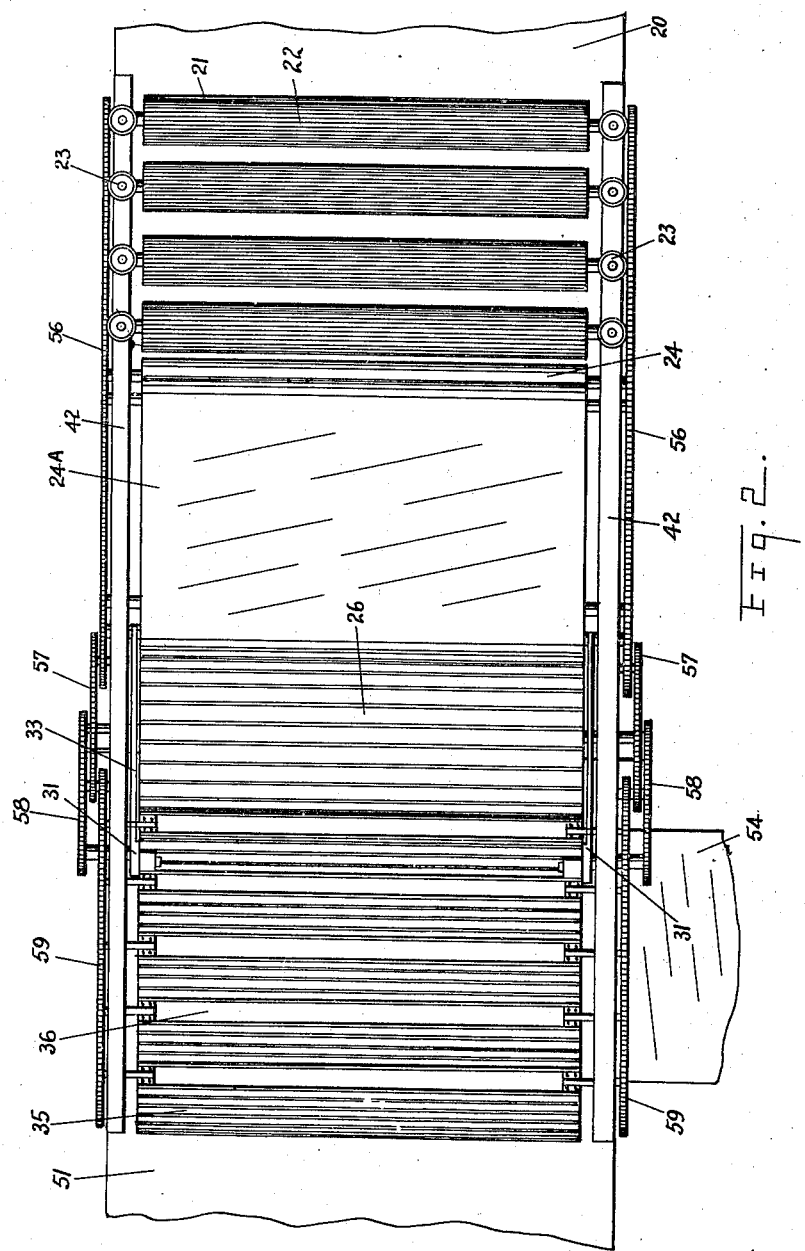
INVENTORS
THOMAS GRAHAM McLAURIN
ROBERT DUNCAN
ATTORNEY July 27, 1948.　　　T. G. McLAURIN ET AL　　　2,446,055
MACHINE FOR CLEANING AND SEPARATING
FLAX OR OTHER FIBROUS PLANTS
Filed Nov. 3, 1944　　　　　　　　　　　　　　4 Sheets-Sheet 3
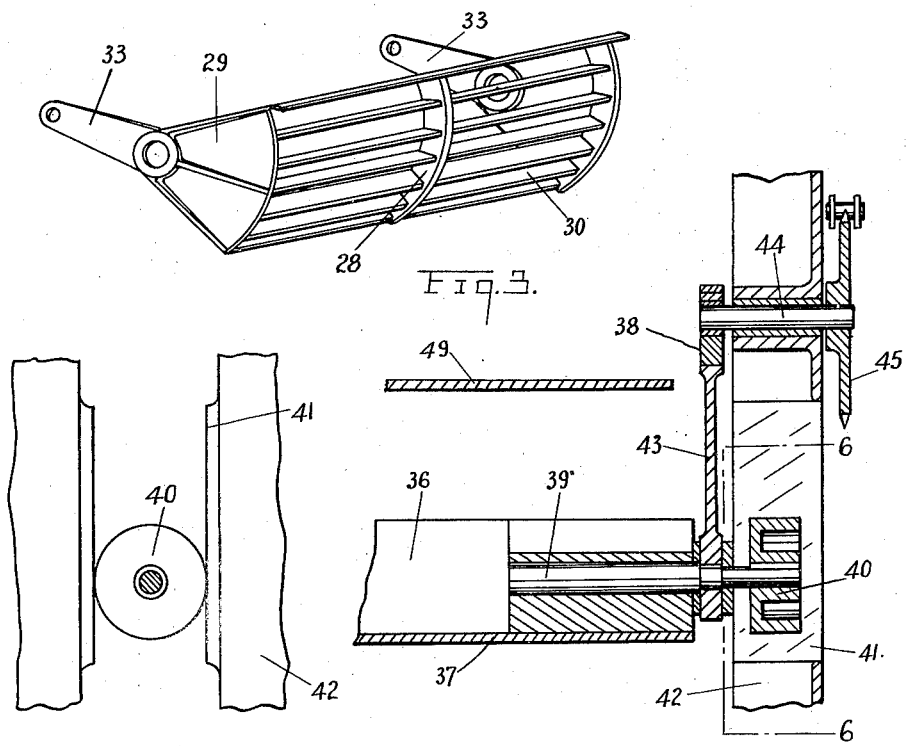
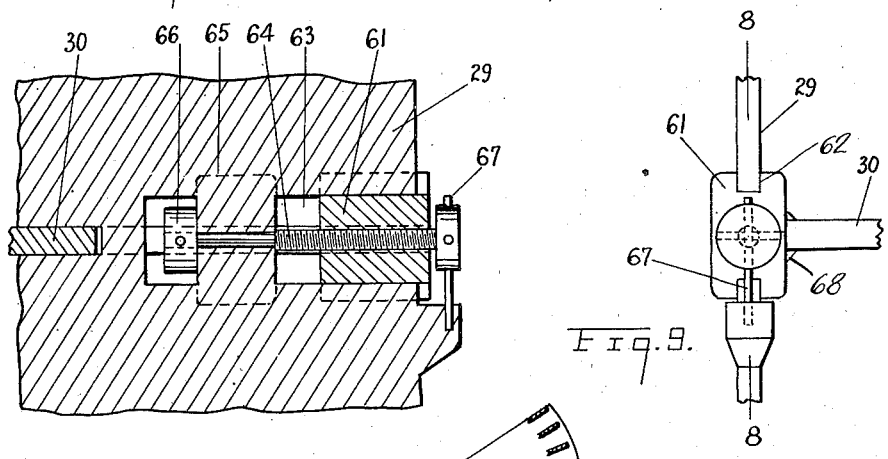
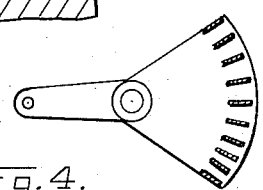
INVENTORS
THOMAS GRAHAM McLAURIN
ROBERT DUNCAN
By
ATTORNEY July 27, 1948.　　T. G. McLAURIN ET AL　　2,446,055
MACHINE FOR CLEANING AND SEPARATING
FLAX OR OTHER FIBROUS PLANTS
Filed Nov. 3, 1944　　4 Sheets-Sheet 4
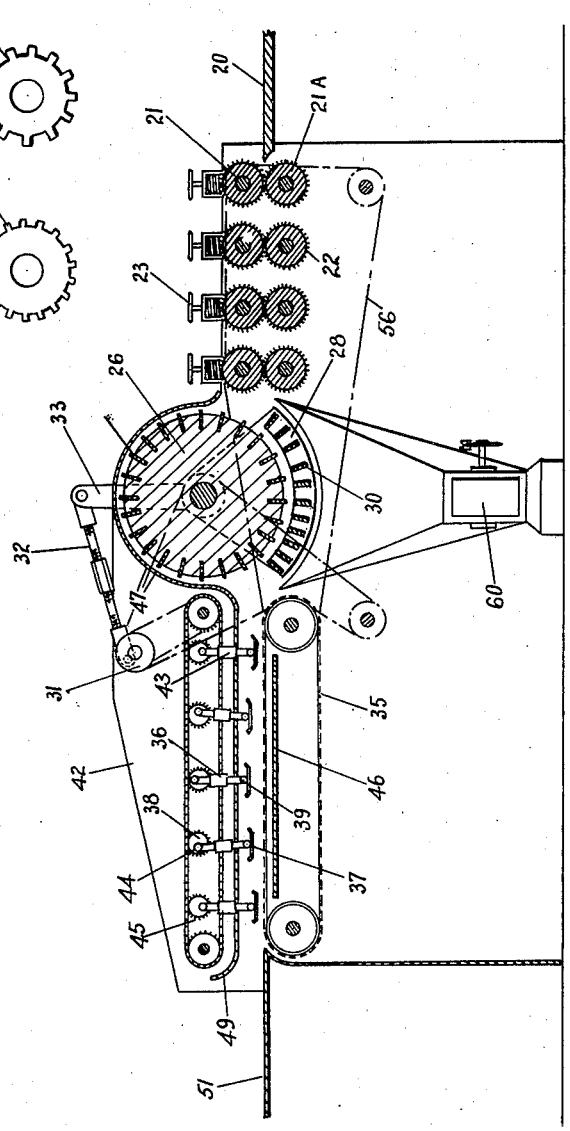
INVENTORS
THOMAS GRAHAM McLAURIN
ROBERT DUNCAN
ATTORNEY.

Patented July 27, 1948

2,446,055

UNITED STATES PATENT OFFICE 2,446,055

MACHINE FOR CLEANING AND SEPARATING FLAX OR OTHER FIBROUS PLANTS

Thomas Graham McLaurin and Robert Duncan, Montreal, Quebec, Canada

Application November 3, 1944, Serial No. 561,760
In Canada November 4, 1943

1 Claim. (Cl. 19—30)

This invention relates to machines for cleaning and separating flax or other fibrous plants such as hemp, ramie, jute, sansevieria, okra, sisal, urena, lobata, pineapple and other grasses and vegetables, as described in the present specification and illustrated in the drawings forming a part of the same.

The invention consists essentially in providing means in succession to decorticate by breaking the bark or woody portion, in small particles from the fibres and separating the fibres in any desired size, and beating out all waste material from the fibres.

One of the objects of this invention is to provide means whereby all fibres may be separated and recovered without damage or cutting, with the least expenditure of power and in the shortest possible time, either in the retted or unretted state.

A further object is to produce fibres completely separated from each other and from all waste matter, thereby greatly increasing the commercial value of the crop.

Referring to the drawings Figure 1 is a longitudinal sectional elevation of a machine for extracting the stock from fibres.

Figure 2 is a plan view of the machine illustrated in Figure 1.

Figure 3 is a perspective view of the knife carrier.

Figure 4 is a section through the knife carrier shown in Figure 3.

Figure 5 is a partial sectional view of a beater.

Figure 6 is a section on the line 6—6 of Figure 5.

Figure 7 is a longitudinal sectional elevation of a simplified form of the invention.

Figure 8 is a fragmentary view of an adjustable mounting for the knives on the knife carrier.

Figure 9 is a front view of the adjustable feature shown in Figure 8.

Figures 10 and 11 are detail views of two of the toothed rollers.

Figure 1:
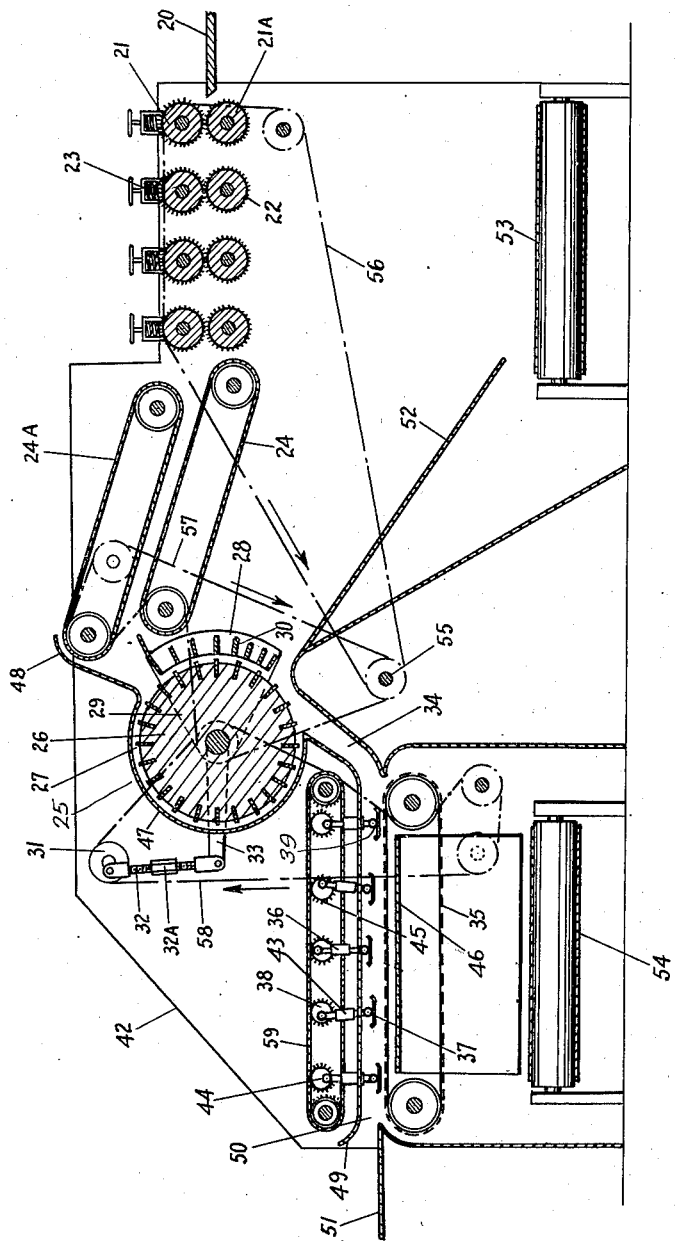

Referring to the drawings, a feeding and sorting table 20 is placed at a suitable body height from the floor, level and adjacent to the throat or nip of the first pair of rollers 21 and 21A. These rollers 21 and 21A are preferably of solid cast iron and have their surfaces formed of longitudinal teeth 22. An adjustable spring loading device 23 is located at each end of the pair of rollers to ensure that the teeth 22 of each of the rollers mesh with each other and maintain pressure on the stalks to be cleaned, as they pass through between the rollers. In the drawings, four pair of rollers 21 and 21A are shown, but this number may be increased or decreased to suit the needs of the particular plants being treated. In order to break up the woody stalk of the plants, each advancing pair of rollers 21 and 21A is provided with a greater number of teeth for the same pitch diameter, so that, as the stalks advance between the pairs of rollers, the woody part is broken up into progressively finer particles.

Adjacent the throat of the last pair of rollers 21 and 21A, a conveyor belt 24 carries the material onward to the rotor section 25 of the machine. A companion belt 24A is situated directly above and has its adjacent surface travelling in the same direction as the belt 24, and holds the material undisturbed during its onward travel.

The rotor section 25 of the machine consists of the rotor 26 which has longitudinal teeth 27 set in its periphery. The teeth 27 project only a limited amount from the surface of the rotor 26 and may have their edges shaped to give the maximum breaking effect on the woody stock of the material. An arcuate oscillating knife carrier 28 mounted on brackets 29 is journalled on the shaft of the rotor 26 and is provided with knives 30, set with their edges directed towards the centre of the rotor 26. The knives 30 can be set at a fixed radius from the centre of the rotor 26 to give a limited clearance between them and the teeth 27 of the rotor.

Wherever it is desired to have some adjustment of the knives 30 in relation to the teeth 27 of the rotor 26, such as when various products of different texture are being harvested and treated on the same machine, adjustable knives are provided whereby the pathway between the knives and the rotor can be increased or decreased to suit the bulk of the material being treated at the time. One form of mounting and adjustment of the knives is shown in Figures 8 and 9. In this form, the knives 30 are connected to machined blocks 61 at 68. The blocks 61 are grooved at 62 to reciprocate in the guideways 63 in the brackets 29. A captive screw 64, having one end journalled in the boss 65 and retained by the nut 66, is threaded through the block 61. As the screw 64 is rotated by means of the pin 67, the position of the block 61 and the blade 30 are adjusted inwardly or outwardly as desired to suit the material being treated. The pin 67 acts as a locking pin after the knife has been set.

The rotor 26 is constantly driven in a clockwise direction while the knife carrier 28 is oscillated through a small arc about the circumference of the rotor 26 by means of the crank 31, through the link arm 32 to the extension arm 33 of the bracket 29. A turnbuckle 32A provides means to adjust the operating position of the knife carrier 28 in relation to the discharge position of the belt 24. The knives 30 at the top end of the carrier 28 are spaced equal to that of the teeth 27 on the rotor 26 and from there down to the opposite end of the carrier the knives are gradually reduced in spacing to give a finer breaking of the stocks as they pass.

Adjacent the lowest point of the rotor is the opening of a downwardly inclined passageway 34 leading to the slat belt 35. This belt 35 forms a conveyor for the treated fibres. Immediately above the slat belt 35 are the beaters 36 formed of flat plates 37. These beaters are reciprocated vertically by means of the crank 38. Each beater 36 is provided with a stub shaft 39 at each end, on which is journalled the roller 40. This roller 40 is situated between the guides 41 in the main frame 42 of the machine and constrains the beaters to a vertical path against the action of the rotating crank 38. A connecting link 43 between the crank 38 and the stub shaft 39 provides the drive to the beater while the stub shaft 44 and the sprocket 45 constitute the driving means from the chain 59 to the crank 38.

The number of beaters in the machine can be determined in connection with the material to be treated, but a set of five are shown as giving the best results.

A perforated support 46 is fitted below the top surface of the slat belt 35 to provide support against the action of the beaters.

In order to ensure the maximum efficiency of the machine and to provide a confined passageway for the treated fibres, a casing 47 is fitted about the rotor 26 and extends upwards at 48 to close over the end of the belt 24A. The lower end of the casing 47 forms the upper surface of the passageway 34 and from there carries forward over the beaters at 49 to form the passageway 50 leading to the table 51 from which the cleaned fibres are gathered.

From the upper end of the passageway 34 a plate 52 guides waste material from the rotor section to the conveyor belt 53. This conveyor belt 53 also receives waste material from the rollers 21 and 21A. A conveyor belt 54 is situated under the beater section of the machine to receive and carry away waste material.

Suitable drives to the various sections of the machine are provided and are preferably of the chain type. The main drive shaft 55 receives power from a source not shown. From this shaft 55 a drive 56 is taken to the rollers 21. The sprockets on each set of rollers 21 and 21A are provided with a varying number of teeth so that the R. P. M. of each set of rollers will be progressively higher. A second drive 57 is taken from the shaft 55 to the rotor 26 and to the belts 24 and 24A. A third drive 58 is taken from the rotor to the beater drive 59 and the belt 35 and also to the crank 31.

In the form of the invention illustrated in Figure 7, the line of flow of the material being treated has been confined to a practically straight line. The elements of the machine are the same as shown in Figure 1, except that the toothed rollers 21 and 21A feed the stalks directly into the throat or passageway between the rotor 26 and the arcuate oscillating knife carrier 28. In this instance the knife carrier 28 is positioned directly below the rotor 26 and is operated from the crank drive 31, through the link 32 and the extension arm 33. A suction fan 60 is installed below the knife carrier 28 to draw off the separated waste without disturbing the treated fibres. As the fibers leave the rotor section they immediately pass on to the slatted belt 35 where they are acted upon by the beaters in the same manner as in the form illustrated in Figure 1.

In the operation of this invention the raw flax or similar fibrous plants are spread on the table 20 and are fed in an even spread and depth between the rollers 21 and 21A where the woody stalks are broken into progressively smaller parts, as they pass from one pair of rollers to another. During this part of the process a certain percentage of the woody stalk is separated from the fibres and falls to the conveyor belt 53, which carries it off to the waste pile. From the rollers, the material is carried forward to the rotor section 26. The rotor 26, which is rotating in a clockwise direction, receives the material and carries it down between it and the oscillating knife carrier 28 which is arcuate in shape to conform to the circumference of the rotor.

Between the rotor and the arcuate knife carrier the stalks are kneaded to further break up the woody parts and separate them from the fibres. The rapid rotation of the rotor acts as a blower at this point to expel the waste matter through the knife carrier to the conveyor belt 53. Furthermore, as the knives in the carrier 28 are placed progressively closer together, the fibres are kneaded more often as they progress forward and therefore a greater separating effect is obtained. The speed of the rotor 26 and the number of oscillations of the knife carrier 28 can be adjusted to give the greatest effect and efficiency to this portion of the machine.

As the fibres leave the rotor section of the machine they are guided on to the slat belt 35, where they are acted upon by the beaters 36, which reciprocate at relatively high speed. The action of the beaters is such that any waste material still adhering to the fibres is expelled through between the slats of the belt 35 and carried off by the conveyor belt 54.

The speed of the belt 35 and the number of strokes per minute of the beaters must be such that, at the instant the beaters contact the fibres, there shall be no tendency for the beaters to hold the fibres against the forward movement of the belt, also, the width of the plate 37 of the beaters should preferably be greater than the width of a slat of the belt 35 and the width of the slot or space between slats, to prevent the fibres being pounded into these spaces.

By the use of this machine, the fibres are cleaned and the waste matter separated from them to such an extent as to greatly increase their market value over what has been possible with the use of any other machine.

What we claim is:

In a cleaning machine for flax or other fibrous plants, a breaker section consisting of a series of toothed rollers meshing with each other in pairs under spring pressure, each of said pairs of rollers having teeth of a finer pitch than those of the preceding pair, a breaking and separating section comprising a toothed rotor and an arcuate knife carrier oscillating about the circumference of said rotor, the knives or teeth of the lower portion of said carrier being spaced progressively closer together, means to individually adjust the knives on said carrier radially in relation to the teeth on the rotor, a beater section comprising a slatted endless belt, a perforated support below the top section of said slatted belt and spaced therebelow a sufficient distance to allow vibrations of the belt, a series of beater plates, each beater being constrained to beat upon the fibres passing on the slatted belt and acting to force the refuse through between the slats of the belt, and means to drive the various sections synchronously with each other.

THOMAS GRAHAM McLAURIN.
ROBERT DUNCAN.

REFERENCES CITED

The following references are of record in the file of this patent:

UNITED STATES PATENTS

| Number | Name | Date |
|---|---|---|
| 340,514 | Lycan | Apr. 20, 1886 |
| 987,342 | Brolin | Mar. 21, 1911 |
| 2,177,646 | Gardner | Oct. 31, 1939 |
| 2,177,647 | Gardner | Oct. 31, 1939 |
| 2,293,056 | Gardner | Aug. 18, 1942 |

FOREIGN PATENTS

| Number | Country | Date |
|---|---|---|
| 687,769 | France | Aug. 13, 1930 |